T. ROWE.
CLOSURE FOR RUBBER RECEPTACLES.
APPLICATION FILED MAY 2, 1916.
1,220,006.
Patented Mar. 20, 1917.
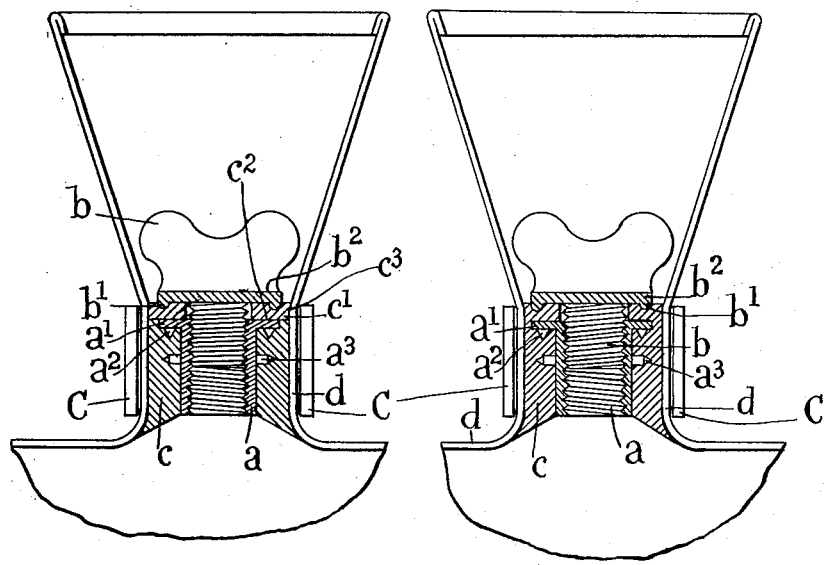
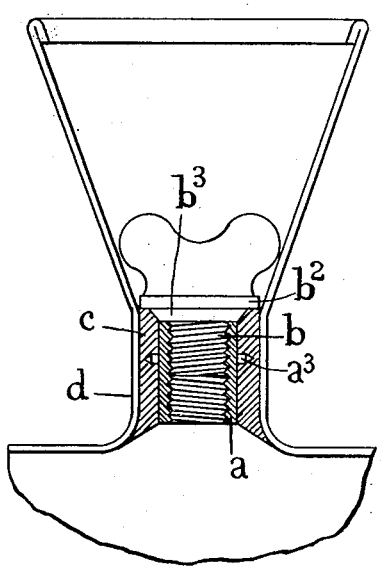
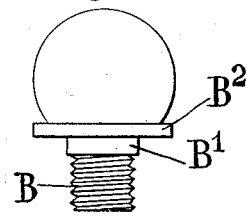
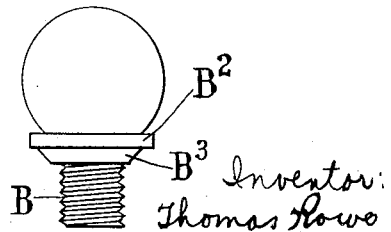
Inventor:
Thomas Rowe
By _____
his attorneys

UNITED STATES PATENT OFFICE.

THOMAS ROWE, OF LEYTONSTONE, ENGLAND.

CLOSURE FOR RUBBER RECEPTACLES.

1,220,006.　　　　Specification of Letters Patent.　　Patented Mar. 20, 1917.

Application filed May 2, 1916. Serial No. 94,900.

*To all whom it may concern:*

Be it known that I, THOMAS ROWE, a subject of the King of Great Britain, residing at Leytonstone, in the county of Essex, England, have invented certain new and useful Improvements in Closures for Rubber Receptacles, of which the following is a specification.

The object of the present invention is to construct a perfectly watertight or airtight india-rubber bottle, bed, cushion, or the like.

According to a prior invention described in the specification of British Patent No. 21,768 of 1914 I formed a screw thread in the rubber forming part of the neck of the hot water bottle or the like, and when forming the interior screw-threaded portion of the neck of hard rubber, I carried a portion of the softer exterior rubber of the casing over the harder rubber, to form a soft watertight seating for the metal or like stopper.

In carrying the present invention into effect I employ a socket made of metal or other like material, which is preferably provided with prominent projections as described in the specification of British Letters Patent No. 28,744 of 1913.

Such a socket is embedded in the rubber forming the neck of the bottle or the like, but this rubber is built up around the exterior of the socket and above the upper surface of the same so that it forms a seating for the flange of the stopper.

The socket is preferably formed with an outwardly projecting flange at its top, which flange is below the upper surface of the rubber upon which bears the flange on the stopper.

Various methods of carrying the invention into effect are illustrated in the accompanying drawings.

Figures 1, 2 and 3 each represent a vertical section of the neck or filling aperture of a hot water bottle, bed, cushion or the like.

Fig. 4 is an elevation of a forming stopper or tool, and Fig. 5 shows an elevation of a modified form of said tool.

In all the figures $a$ is the socket, $b$ is the stopper, $c$ is the rubber surrounding the socket $a$, and $d$ is the outer casing of the hot water bottle or the like.

As shown in Fig. 1 the socket $a$ may be covered around its sides with a sheet of unvulcanized rubber $c$, in tubular form as is usual. The upper surface of this tube or sheet $c$ is coated with rubber solution at $c^2$, and a washer or ring $c'$ of unvulcanized rubber, which is coated with solution around its periphery at $c^3$, and on its under surface at $c^2$ is then placed in position above the socket $a$. This washer or ring $c'$ is pressed down by the flange $B^2$ of the forming stopper or tool B shown in Fig. 4, and the rubber $c$ is then pressed tightly around the socket $a$ and forming stopper B by the usual press C. The pressure may be retained until the socket $a$ is vulcanized in position, when the parts $c$, $c'$, will form one united mass.

Another method of securing the rubber $c$ in position above the socket $a$, as shown in Fig. 2, is to cover the socket $a$ around its exterior with plastic rubber in the usual manner, but leaving some rubber projecting above the socket $a$. The stopper B, (Fig. 4) which has a cylindrical part B' between the screw thread and the flange $B^2$, is then screwed into the socket $a$, leaving the said cylindrical part B' above the socket $a$. When the flange $B^2$ is flat as shown in Fig. 4, the rubber $c$ above the socket $a$ will also be flat. It is customary to use a press C to squeeze the rubber $c$ around the socket $a$, and this same press is employed to simultaneously squeeze the rubber $c$ around the cylindrical part B' of the stopper B.

The stopper B shown in Fig. 4 is merely used in the formation of the neck of the bottle or other container.

The stopper $b$, which is used for closing the bottle or the like, has its screw thread carried up nearer to the flange $b^2$ than in the stopper B; consequently the flange $b^2$ may be screwed down tightly upon the rubber $c$ located above the socket $a$.

In Figs. 1 and 2 the flange $b^2$ is shown with a downwardly projecting rim $b'$, which presses firmly against the rubber $c$ and, due to less friction, is more readily unscrewed.

When the socket $a$ has a flange $a'$ around its upper surface, this flange may have projections $a^2$ on the under surface, as shown in Figs. 1 and 2, to assist in preventing the socket $a$ turning in the neck of the bottle or the like. $a^3$ are prominent projections on the body of the socket $a$, as described in the specification of British Letters Patent No. 28,744 of 1913.

It will be noticed in Fig. 1 that the washer $c'$ overlaps or covers the top surface of the socket flange $a'$, and in Fig. 2 that the rubber $c$ overlaps the top of the socket $a$. This overlapping or covering of the socket $a$ is not essential, and in Fig. 3 I have shown a construction in which the rubber $c$ projects above the upper surface of the socket $a$ but does not overlap or cover the same. In this figure the rubber $c$ may be in the form of a tube or sheet of unvulcanized rubber, and the upper part is prevented from overlapping or covering the upper surface of the socket $a$ by means of the conical part $B^3$ on the forming stopper B, as shown in Fig. 5. The flange $b^2$ of the stopper $b$ will press upon the upper surface of the rubber $c$, as shown in Fig. 3, and render the bottle or the like watertight.

It will be observed in Fig. 3 that the rubber $c$ surrounding the socket $a$ has a conical upper surface, and that the stopper $b$ has a flange $b^2$ which is conical on its under surface at $b^3$. The formation of the conical upper surface of the rubber $c$ is due to the conical formation $B^3$ on the under surface of the flange $B^2$ of the forming stopper B shown in Fig. 5, which presses upon the rubber $c$ before it is vulcanized and causes it to retain this conical shape after vulcanization.

It will be understood that the rubber $c$ around the socket $a$ forms part of the bottle or other container and is vulcanized in position; consequently there can be no leak between it and the outer casing $d$ of the bottle or the like. When the flange $b^2$ on the closing stopper $b$ is screwed down tightly onto the washer $c'$, which is also vulcanized in position above the socket $a$, or onto the rubber $c$, the bottle or the like is rendered quite tight even should the socket $a$ get slightly loose in the rubber $c$ in which it is embedded.

Sockets having prominent projections as above mentioned will remain in position even if they be slightly loose in the rubber in which they are embedded.

What I claim as my invention is:—

1. In a device of the character described, the combination of an internally screw-threaded socket, a screw-threaded stopper in said socket, a flange on said stopper, rubber surrounding said socket and extending above the upper surface thereof to form a seating for the said flange, and an outer casing, the rubber and the casing being vulcanized in position on said socket, substantially as set forth.

2. In a device of the character described, the combination of an internally screw-threaded socket, prominent projections on the exterior of said socket, a screw-threaded stopper in said socket, a flange on said stopper, rubber surrounding said socket and extending above the upper surface thereof to form a seating for the said flange, and an outer casing, the rubber and the casing being vulcanized in position on said socket, substantially as set forth.

3. In a device of the character described, the combination of an internally screw-threaded socket, an outwardly extending flange at the upper part of said socket, a screw-threaded stopper in said socket, a flange on said stopper, rubber surrounding said socket and extending above the upper surface of the flange on said socket to form a seating for the flange on the stopper, and an outer casing, the rubber and the casing being vulcanized in position on said socket, substantially as set forth.

4. In a device of the character described, the combination of an internally screw-threaded socket, prominent projections on the exterior of said socket, an outwardly extending flange at the upper part of said socket, a screw-threaded stopper in said socket, a flange on said stopper, rubber surrounding said socket and extending above the upper surface of the flange on said socket to form a seating for the flange on the stopper, and an outer casing, the rubber and the casing being vulcanized in position on said socket, substantially as set forth.

5. In a device of the character described, the combination of an internally screw-threaded socket, prominent projections on the exterior of said socket, an outwardly extending flange at the upper part of said socket, prominent projections on the under surface of said flange, a screw-threaded stopper in said socket, a flange on said stopper, rubber surrounding said socket and extending above the upper surface of the flange on said socket to form a seating for the flange on the stopper, and an outer casing, the rubber and the casing being vulcanized in position on said socket, substantially as set forth.

In witness whereof I have hereunto set my hand.

THOMAS ROWE.

Copies of this patent may be obtained for five cents each, by addressing the "Commissioner of Patents, Washington, D. C."